United States Patent [19]

Wakeman et al.

[11] Patent Number: 5,050,803

[45] Date of Patent: Sep. 24, 1991

[54] ACTUATION SYSTEM FOR POSITIONING A VECTORING EXHAUST NOZZLE

[75] Inventors: Thomas G. Wakeman, Lawrenceburg, Ind.; Thomas S. Clayton, Cincinnati; Conrad D. Wagenknecht, Westchester, both of Ohio

[73] Assignee: General Electric Company, Cincinnati, Ohio

[21] Appl. No.: 420,413

[22] Filed: Oct. 12, 1989

[51] Int. Cl.⁵ .............................................. F02K 1/00
[52] U.S. Cl. ............................. 239/265.35; 239/265.37; 239/265.19; 60/230; 60/232
[58] Field of Search ................. 239/265.19, 265.25, 239/265.27, 265.29, 265.33, 265.35, 265.37; 60/230, 232

[56] References Cited

U.S. PATENT DOCUMENTS

| | | | |
|---|---|---|---|
| 3,387,788 | 6/1968 | Brown | 239/265.37 |
| 3,979,067 | 9/1976 | Nash | 239/265.35 |
| 3,986,687 | 10/1976 | Beavers et al. | 244/12 D |
| 4,000,854 | 1/1977 | Konarski et al. | 239/265.35 |
| 4,361,281 | 11/1982 | Nash | 239/265.37 |
| 4,375,276 | 3/1983 | Konarski | 60/232 |
| 4,587,806 | 5/1986 | Madden | 60/271 |
| 4,690,329 | 9/1987 | Madden | 239/265.19 |
| 4,763,840 | 8/1988 | Madden | 239/265.35 |
| 4,767,005 | 8/1988 | Ward | 239/265.29 |
| 4,778,109 | 10/1988 | Jourdain et al. | 239/265.27 |
| 4,848,664 | 7/1989 | Thayer | 239/265.29 |

Primary Examiner—Charles A. Marmor
Assistant Examiner—Christopher G. Trainor
Attorney, Agent, or Firm—Jerome C. Squillaro

[57] ABSTRACT

A simplified actuation system for positioning the divergent flaps of a vectorable two-dimensional exhaust nozzle is disclosed. The system includes lever arms having cam surfaces pivotably attached to diverent flap crank shafts. An actuator is pinned to the nozzle sidewall and operably connected to a slider bar which has two cam followers at either end which are fixed with respect to each other and enage the cam surfaces of the lever arms. The slider bar is slideably engaged to the nozzle sidewall so as to permit radial movement with respect to the nozzle centerline. As the convergent flaps are moved the lever arms are translated axially and the cam followers in cooperation with the cam surfaces on the lever arms schedule the relative angle between the divergent flaps and thereby the exit area of the nozzle. Vectoring is provided operating the actuators which translate the cam followers in the radial direction, up or down, thereby rotating the divergent flaps so that they are pitched up or down in unison.

9 Claims, 5 Drawing Sheets

ACTUATION SYSTEM FOR POSITIONING A VECTORING EXHAUST NOZZLE

BACKGROUND OF THE INVENTION

1. Field of the Invention

The present invention relates to flight maneuverable gas turbine exhaust nozzles and, more specifically, to actuating devices for positioning the flaps of vectoring two-dimensional exhaust nozzles.

2. Description of the Related Art

Two-dimensional jet engine augmented exhaust nozzles capable of providing thrust vectoring for in-flight maneuverability or thrust vectoring for short take-off are designed to meet a multitude of operational capabilities within the flight envelope as illustrated by the positions of the exhaust nozzle flaps depicted in FIGS. 1–3. In FIGS. 1–3, three configurations of exhaust nozzle 100 are illustrated corresponding to straight axial thrust, downward vectored thrust, and upward vectored thrust, respectively. Nozzle 100 includes symmetrically opposed convergent flaps 102 and opposed divergent flaps 104 positioned between sidewalls 106. The opposed convergent flaps, opposed divergent flaps, and opposed sidewalls define an exhaust stream flow path of exhaust nozzle 100 indicated by arrow 120. Relative to a central axis 108 of nozzle 100, the exhaust stream flow path may be directed parallel thereto for pure axial thrust without afterburning, or at an angle to axis 108 for vectored thrust as illustrated in FIGS. 2 and 3. In addition to thrust vectoring it is further desireable to modulate the divergent flaps so as to optimize the exit area of the nozzle as a function of the throat area.

Prior art two-dimensional exhaust nozzles capable of meeting each of the flap configurations illustrated in FIGS. 1, 2, and 3 utilized an independent actuation system to move each of the convergent and divergent flaps. This leads to a large number of actuation systems further leading to increased hydraulic load requirements and a reduction in reliability.

Furthermore, prior art two-dimensional thrust vectoring exhaust nozzles commonly mounted the vectoring actuators for the divergent flaps directly to the convergent flaps. This configuration results in additional reliability problems because hydraulic fluid must be fed to the actuators mounted on the movable convergent flaps through rotating couplings or flexible hoses. Such rotating couplings and flexible hoses commonly exhibit leakage problems thus detracting from the reliability of the system.

Furthermore, independent actuation of each divergent flap may result in fail-safe problems since one of the divergent flaps might open if its actuation system fails causing reduced thrust and unwanted vectoring of the exhaust gas stream.

SUMMARY OF THE INVENTION

Accordingly, it is an object of the present invention to provide a simplified actuation system to perform divergent flap modulation without the use of actuators attached to the convergent flaps.

It is a further object of the present invention to reduce the total number of actuation systems required for divergent flap modulation.

It is still a further object of the present invention to provide a simplified actuation system for divergent flap modulation which is also capable of scheduling the ratio of the cross sectional area of the nozzle exit to the cross sectional area of the throat of the nozzle. This exit/throat ratio is critical to maintain high levels of performance during flight, especially high pressure ratio supersonic flight.

Additional objects and advantages of the present invention will be set forth in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects, and in accordance with the purposes of the invention as embodied and broadly described herein, a two-dimensional gas turbine engine exhaust nozzle is provided which includes opposed sidewalls, variable position opposed convergent flaps, and variable position opposed divergent flaps defining a portion of an exhaust stream flow path. The exhaust nozzle includes convergent flap crank means for supporting the convergent flaps, and cam crank means, pivotably attached to the convergent flap crank means, for rotating or pivoting the divergent flaps. The exhaust nozzle further includes means for actuating the cam crank means, and link arm means, extending from the cam crank means to the divergent flaps, for translating the motion of the cam crank means into rotation of the divergent flaps to vector the exhaust stream.

Preferably, the convergent flap crank means includes first and second convergent flap crank shafts disposed at respective upstream ends of the opposed convergent flaps, and the cam crank means includes first and second cam cranks pivotably attached to respective ones of the first and second convergent flaps cranks with each of the cam cranks including, at each end, a cam crank lever arm with a cam surface.

In the present preferred embodiment the means for rotating the cam crank means includes first and second slider bars extending adjacent the sidewalls of the exhaust nozzle and connecting opposed respective ends of the first and second cam cranks to one another. The first and second slider bars each have a cam follower at the distal ends thereof which engage the respective cam surfaces of and operate the first and second cam cranks. First actuator means are provided for the purpose of moving the slider bars relative to the sidewalls to thereby move the cam followers along respective cam surfaces of the cam crank lever arms to rotate the cam cranks and position the divergent flaps for vectored exhaust.

The ratio of the throat area to the exit area of the nozzle is schedueled by setting the nozzle exit area as a function of the position of the convergent flaps. The function is programmed into the cam surface shape so that as the convergent flaps are positioned the angles of each divergent flap with respect to the nozzle centerline is adjusted to maintain a predetermined enozzle exit area.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DESCRIPTION OF THE PREFERRED EMBODIMENT

Figure 1:
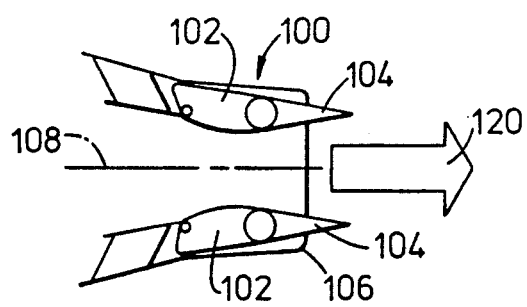
FIG. 1 schematically illustrates a conventional exhaust nozzle with vectorable divergent flaps positioned for straight through axial thrust.
Figure 2:
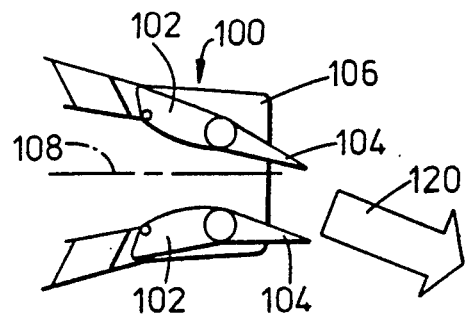
FIG. 2 illustrates the exhaust nozzle of FIG. 1 with divergent flaps vectored downward.
Figure 3:
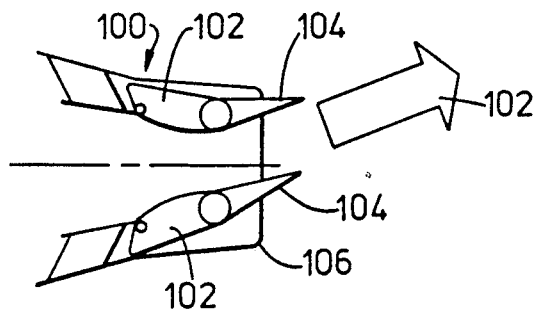
FIG. 3 illustrates the exhaust nozzle of FIG. 1 with the divergent flaps vectored upward.

Reference will now be made in detail to the presently preferred embodiment of the invention as illustrated in the accompanying drawings, in which like reference characters designate like or corresponding parts throughout the several drawings.

Figure 4:
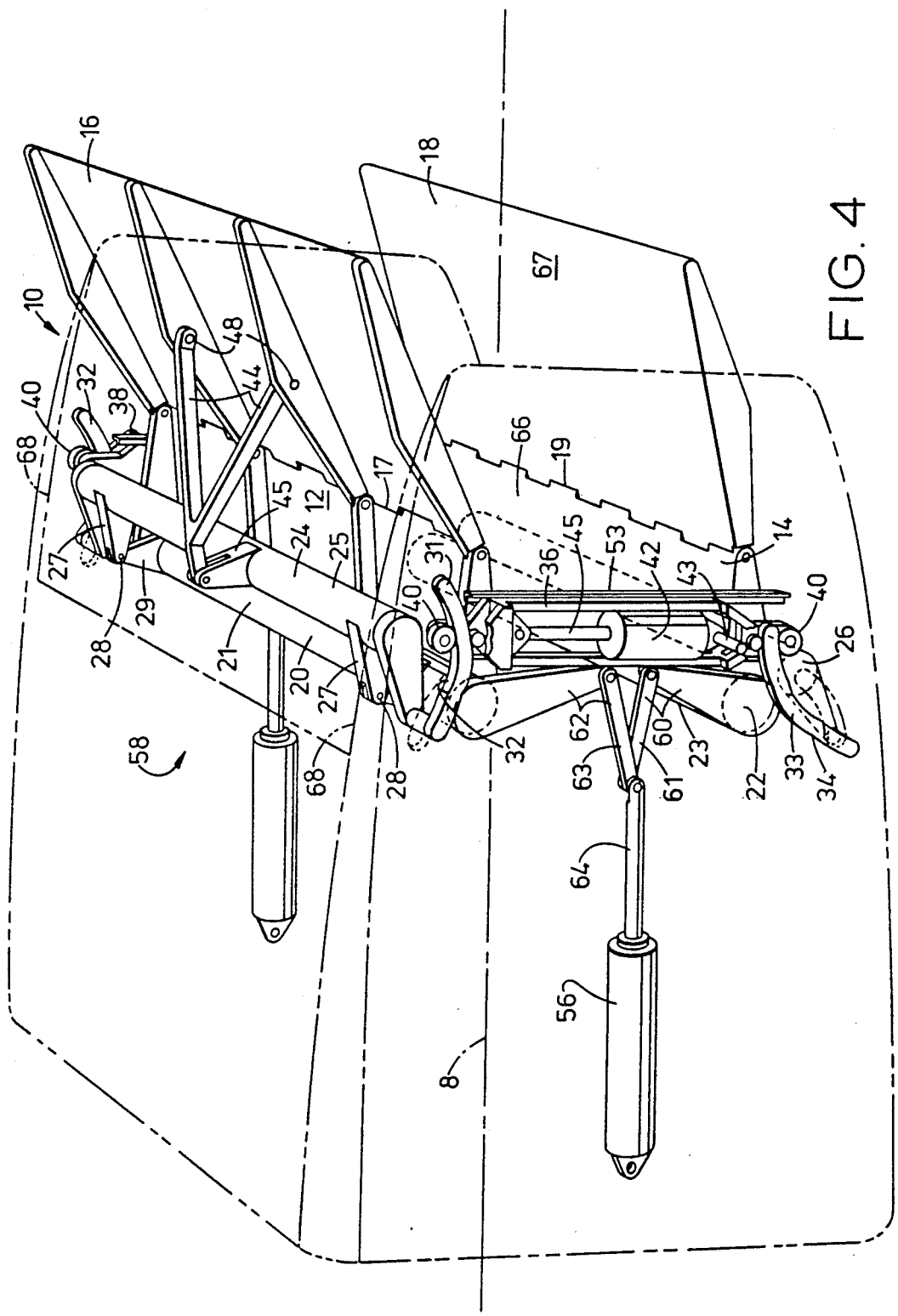
FIG. 4 is an isometric conceptual view of a convergent and divergent two-dimensional exhaust nozzle incorporating one embodiment of the cam actuating means of the present invention.

FIG. 4 illustrates primary components of an exhaust nozzle 10 generally disposed about a nozzle centerline, 8 which may correspond to a centerline, incorporating the teachings of the present invention. Exhaust nozzle 10 includes opposed convergent flaps 12 and 14 pivotably connected at their downstream ends to respective opposed divergent flaps 16 and 18 by means well known in the art such as, but not limited to, hinges 17 and 19. The sidewalls of exhaust nozzle 10 are illustrated with phantom lines in FIG. 4 for purposes of clarity. In the actual configuration of exhaust nozzle 10, the convergent and divergent flaps would extend laterally across the nozzle between the sidewalls.

In accordance with the present invention, exhaust nozzle 10 includes first and second convergent flap crank means for supporting and rotating the convergent flaps 12 and 14. As embodied herein, the convergent flap crank means includes a first convergent flap crank 20 and a second convergent flap crank 22, each supporting a respective one of the opposed convergent flaps 12 and 14. Each of first and second convergent flap cranks 20 and 22 illustrated in FIG. 4 are depicted as comprising relatively straight crank shafts 21 and 23, for purposes of simplicity, and as having first lever arms 60 and 62 at their respective ends. In an actual configuration of an exhaust nozzle incorporating the teachings of the present invention, the convergent flap crank shafts might be configured with a slight rise from each end towards the center of the exhaust nozzle with the inner contour of each convergent flap 12 and 14 corresponding generally to the configuration of the respective convergent flap cranks 21 and 23. Such a configuration will be described in more detail hereinbelow with reference to FIG. 7.

In accordance with the present invention, cam crank means, pivotably attached to the convergent flap crank means, are provided for rotating the divergent flaps. As embodied herein, the cam crank means includes a first cam crank 24 and a second cam crank 26. First cam crank 24 includes a first cam bar 25 which is offset from and pivotably attached to first convergent flap crank 20 by cam crank lugs 27 and cam bar lugs 29 at pivots 28. Similarly, second cam crank 26 is pivotably attached to second convergent flap crank 22 at pivots 30 using a similar pair of lugs or extensions. Pivots 30 are illustrated as a clevis and pin joint but any known configuration for pivots 28 and 30 may be utilized which permit the respective cam cranks to pivot relative to the respective convergent flap crank shaft. Cam crank shaft 24 has attached to it, at each end, a cam shaft lever arm 31 having a cam surface on it to form a cam track 32. The configuration of cam tracks 32 and 34 are identical and a more detailed description of the configuration of the cam track is provided later with reference to the remaining figures. Similarly, cam crank 26 includes a lever arm 33 and a cam track 34 disposed at each end thereof. The shape of cam tracks 32 and 34 control the angle of rotation of cam crank 24 and 26 are identical in construction and the configuration thereof will also be described in more detail hereinbelow.

Figure 9:
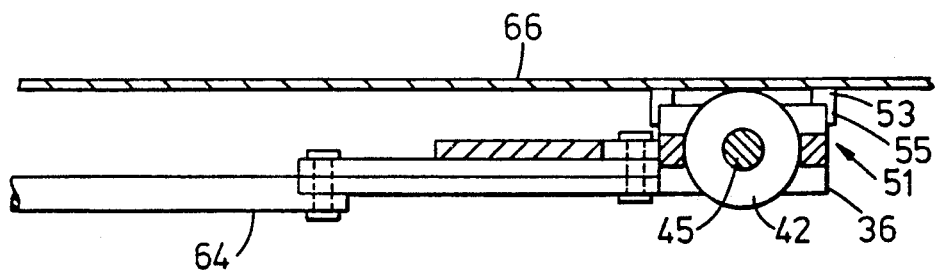
FIG. 9 illustrates a top looking down cross sectional view of a convergent divergent two-dimensional exhaust nozzle incorporating the sliding bar and actuating means of the present invention.

In accordance with the present invention, the exhaust nozzle includes means for rotating the cam crank means in unison in the same rotational direction about the respective pivots 28 and 30 of each cam crank 24 and 26. As embodied herein, the means for rotating the cam crank means in unison includes first and second slider bars 36 and 38. Each of the first and second slider bars 36 and 38 includes cam followers 40 at the ends thereof. Cam followers 40 are positioned within a respective one of cam tracks 32 and 34 and are movable along the travel of the respective cam track. Preferably, slider bars 36 and 38 are disposed adjacent to and within a respective sidewall 66 of nozzle 10. Slider means 51 as illustrated in FIG. 9 are provided for preventing axial movement and assisting radial movement of the slider bars 36 as illustrated but not limited to by a track and rail means 53 wherein track 55 attached to sidewall 66 guides slider bar 36 which acts as its own rail. Preferably the distance between cam followers 40 of slider bars 36 and 38 is fixed thereby maintaining a relatively fixed minimum spacing between opposed sets of cam tracks 32 and 34 for a given axial and radial location of the slider bars. This provides a means for further rotating divergent flaps 16 and 18 in unison but in opposite directions so as to maintain a desired or scheduled exit area to throat area ratio. Also, the slider bars and associated cam followers and cam tracks tend to absorb tension loads placed on the slider bars by the high pressure of the exhaust gases acting on the divergent flaps.

In accordance with the present invention, first actuator means are provided for moving the slider bars up and down relative to the sidewalls which in turn moves the cam followers along respective cam tracks of the cam cranks and rotates the cam cranks to position the divergent flaps for vectored exhaust. As embodied herein, the first actuator means may comprise hydraulically actuated pistons 42 which are fixed to a respective one of the sidewalls of the nozzle by an attachment means as illustrated by a pin 43. Any conventional type of hydraulically actuated piston 42 may be utilized and, therefore, a detailed description of the pistons will be omitted herein. The hydraulic actuator pistons 42 act to move a respective one of the slider bars 36 and 38 vertically relative to the sidewalls of the exhaust nozzle by extending and retracting its piston rod 45.. This vertical movement of the slider bars serves to move cam tracks 32 and 34 relative to cam followers 40 thereby rotating cam cranks 24 and 26 in unison in the same direction about their respective pivots 28 and 30. In unsion means that each flap is pivoted in the clockwise or counter clockwise direction by approximately the same number of degrees.

In accordance with the present invention, the exhaust nozzle further includes link arm means, extending from the cam crank means to the divergent flaps, for translating the travel or rotation of the cam crank means into movement of the divergent flaps to thereby vector the exhaust stream emerging from exhaust nozzle 10. As embodied herein, the link arm means comprises first link arms 44 is pivotally connected to and extending from cam crank 24 by a cam bar clevis joint 46 and connected to divergent flap 16. Each link arm 44 is pivotally connected to divergent flap 16 by a pivot joint or clevis 48. The configuration of the joint or clevis 48 is standard and not critical to the operation of the present invention and, therefore, its detailed description will be omitted. Similarly on the bottom of the nozzle, the link arm means further includes link arms 50 extending from a cam bar clevis joint 52 similar in construction to the cam bar link arm clevis joint 46. Each of the link arms 50 extends from clevis joint 52 to divergent flap 18 where it is connected by a clevis joint or pivot 54 similar to the clevis 48 connecting link arms 44 to divergent flap 16. Although two link arms are shown extending from respective cam cranks 24 and 26 to divergent flaps 16 and 18, this number is not limitative of the present invention and any desired number of link arms may be incorporated extending from any desired number of clevis joints on cam bars 24 and 26. However, the illustrated configuration provides for a balance of internal hot exhaust gas pressure force acting upon each of the divergent flaps 16 and 18 against the force provided by the actuators when being positioned by movement of the respective link arms 44 and 50.

Finally, in order to provide additional operational capabilities and configurations of the convergent and divergent flaps defining the exhaust gas flow path of nozzle 10, a second actuator means is provided for rotating the convergent flap crank means to thereby selectively position convergent flaps 12 and 14 to schedule the ratio of the cross-sectional of throat 66 to the cross-sectional area of nozzle exit 67. As embodied herein, the second actuating means comprises hydraulically actuated pistons 56 and 58 disposed within the opposed sidewalls of nozzle 10. Hydraulic actuators 56 are connected at a respective end of each of convergent flap cranks 20 and 22 by first lever arms 60 and 62, which are in turn connected to the movable piston 64 of hydraulic actuators 56 and 58. Since each of hydraulic actuators 56 and 58 and their respective link arms 60, 62 and piston 64 are identical in construction, the configuration of only one of those actuators will be described herein.

As piston 64 of hydraulic actuator 56 is moved longitudinally, or forward and aft, relative to a respective sidewall of exhaust nozzle 10 and nozzle centerline 108, link arms 60 and 62 are rotated to thereby rotate convergent flap cranks 20 and 22. This rotation of convergent flap cranks 20 and 22 causes movement of convergent flaps 12 and 14 while concurrently causing movement of divergent flaps 16 and 18 by rotation of pivots 28 and 30 which are attached to respective ones of cranks 20 and 22. For simplicity in the description of the present invention, the movement of the convergent and divergent flaps may be envisioned as two separate operations which would occur simultaneously with rotation of the convergent flap cranks. First, as convergent flap cranks 20 and 22 are rotated, the upstream end of convergent flaps 12 and 14 are moved toward one another to either enlarge or reduce the cross sectional area of throat 66 of nozzle 10. Secondly, since pivot joints 28 and 30 extend from convergent flap cranks 20 and 22 respectively, those pivot joints are also rotated as the convergent flap crank shafts are rotated by rotation of lever arms 60 and 62. Moreover, this rotation of pivot joints 28 and 30 causes rotation of cam cranks 24 and 26 which are pivotably connected thereat to respective convergent flap crank shafts. Thus, as the pivot joints 28 and 30 are moved to a different position by rotation of convergent flap cranks 20 and 22, the cam cranks 24 and 26 are also moved or rotated resulting in movement of divergent flaps 16 and 18 through link arms 44 and 50. Since cam cranks 24 and 26 pivot relative to convergent crank shafts 20 and 22 at respective pivot joints 28 and 30, the travel or movement of divergent flaps 16 and 18 is determined by the particular configuration of cam cranks 24 and 26 where they are attached to pivot joints 28 and 30. Moreover, additional rotation of the divergent flaps 16 and 18 is controlled by the angle of the cam crank means about pivot joints 28 and 30 by adjusting the angle of tracks 32 which control the pivot of cam crank about pivot joints 28 and 30. Schedualing of these angles is accomplished by designing the shape or curvature of cam tracks 32 which may be used to program the optimal configuration for throat/exit area ratio for the various settings of the convergent flaps or throat area. The pressure of the exhaust flow in the nozzle tends to force the flaps vertically outward from the nozzle centerline 108, however, since they are hinged or pinned or limited in translation by the various joints and linkages the respective linkages control or limit the degree to which they rotate or translate. The divergent flaps would open up to a 90 degree angle if the rotation wasn't limited by the cam lever arms or tracks 32. By camming the tracks the rotation angles to the divergent flaps are controlled.

By appropriate design of the configuration of cam bars 24 and 26 and cam tracks 32 and 34, movement of slider bars 36 and 38 and their respective cam followers 40 along cam tracks 32 and 34 will permit positioning of divergent flaps 16 and 18 for pitch vectoring of the exhaust stream emerging from nozzle 10 and optimizing the ratio of the throat area to the exit area of the nozzle. Such appropriate configuration of cam cranks 24 and 26 and cam tracks 32 and 34 will become more clear with reference to the figures and descriptions thereof which continue below.

Figure 7:
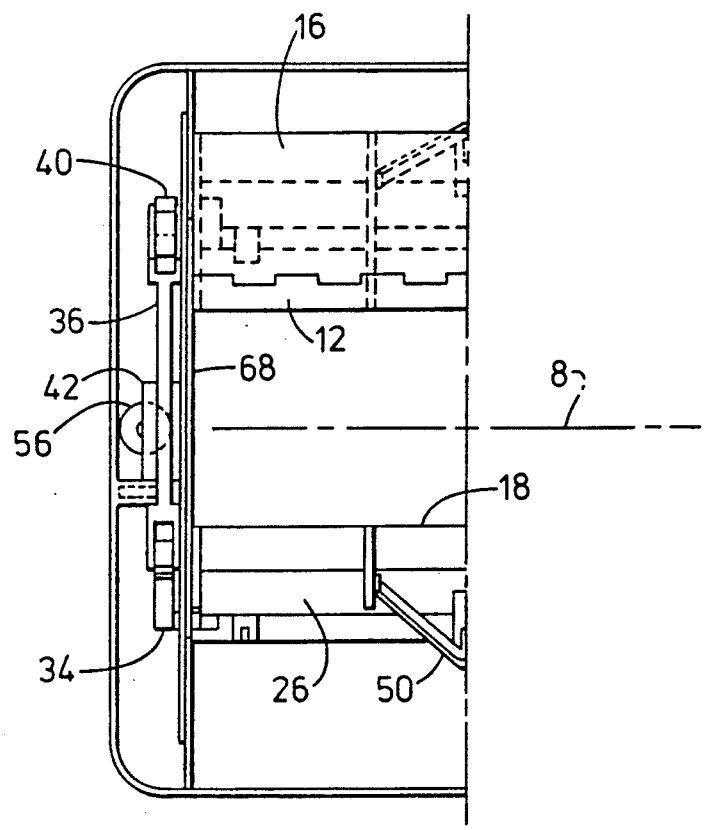
FIG. 7 illustrates a partial front view of the exhaust nozzle of FIG. 5.
Figure 5:
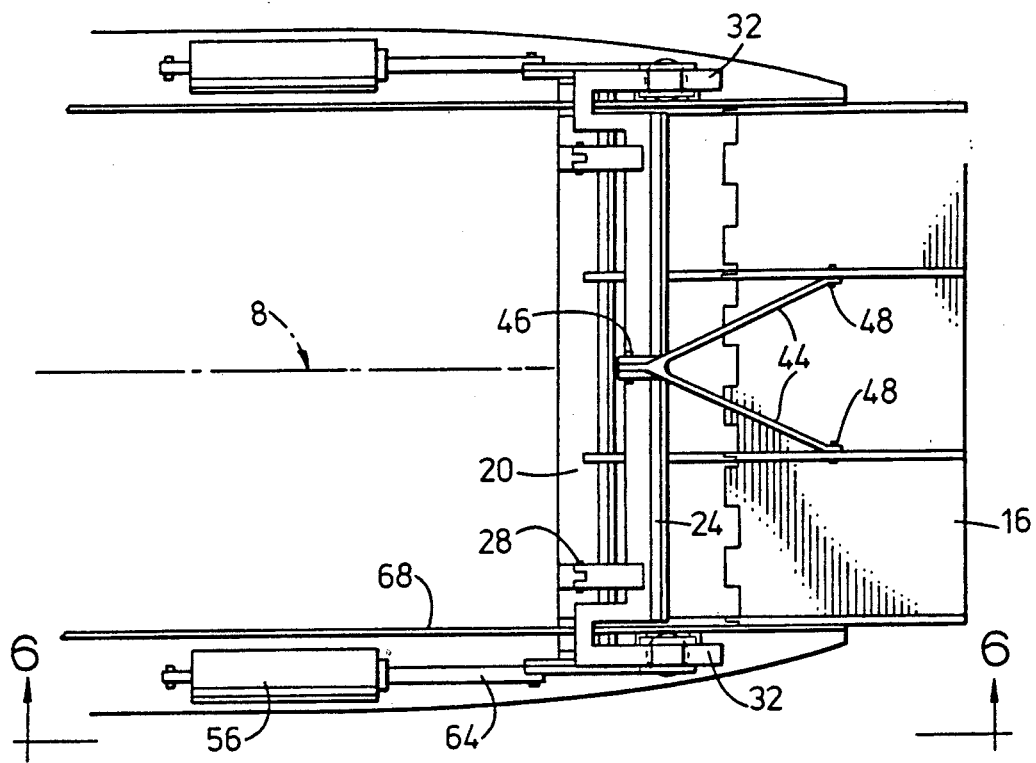
FIG. 5 illustrates a top view of a convergent divergent two-dimensional exhaust nozzle incorporating the cam actuating means of the present invention.
Figure 6:
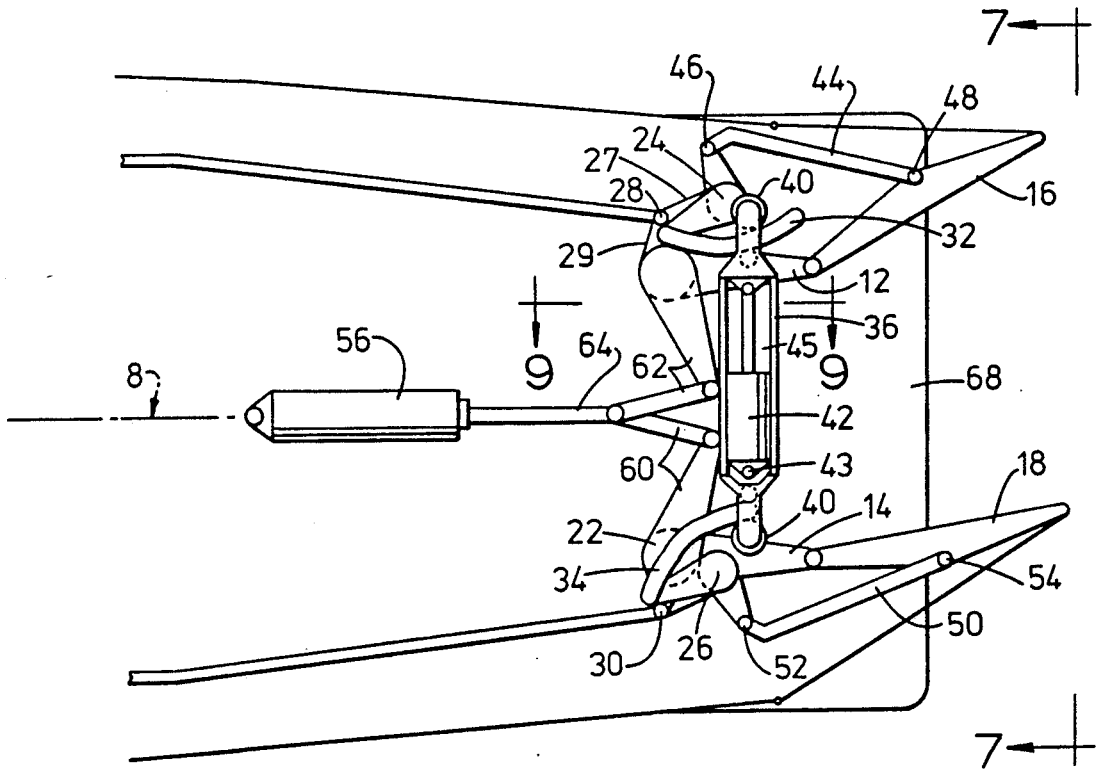
FIG. 6 illustrates a side view of the exhaust nozzle of FIG. 5.

With reference to FIGS. 5, 6 and 7 there is illustrated, respectively, a top view, a side view, and a partial front view of an exhaust nozzle 10 incorporating the teachings of the present invention. With reference to FIG. 5, there is illustrated cam crank 24, convergent flap crank 20, and pivot 28 of cam crank 24 to convergent flap crank 20. At the outermost end of cam crank 24, cam track 32 extends longitudinally within sidewall 68 of nozzle 10. Similarly, although not illustrated in FIG. 5, at the opposite end of cam crank 24 the other cam track 32 extends longitudinally within the opposite sidewall.

Link arms 44 are also illustrated in FIG. 5 extending from the cam bar-link arm clevis 46 to divergent flap 16.

With reference to FIG. 6, slider bar 36 is shown extending between cam track 32 and cam track 34 with cam followers 40 disposed in a respective cam track. FIG. 6 further illustrates hydraulic piston actuator 42 for moving slider bar 36 upwardly and downwardly in FIG. 5, and hydraulic actuator 56 connecting link arms 60 and 62 to convergent flap crank shaft 20. As piston 64 of actuator 56 is moved longitudinally, i.e., from left to right and right to left in FIG. 6, link arms 60 and 62 rotate convergent flap crank shafts 20 and 22 to position the convergent flaps and vary the cross sectional area of throat 66.

FIG. 7 illustrates a partial front view of exhaust nozzle 10 of FIGS. 5 and 6, wherein the slight upward rise of convergent flap crank 20 is illustrated between sidewall 68 and the central axis 70 of the nozzle. As illustrated in FIG. 7, divergent flap 16 may also be configured with a slight upwardly bent contour towards axis 70 to match the slight upwardly bent contour of convergent flap crank 20 and convergent flap 12.

Figure 8A:
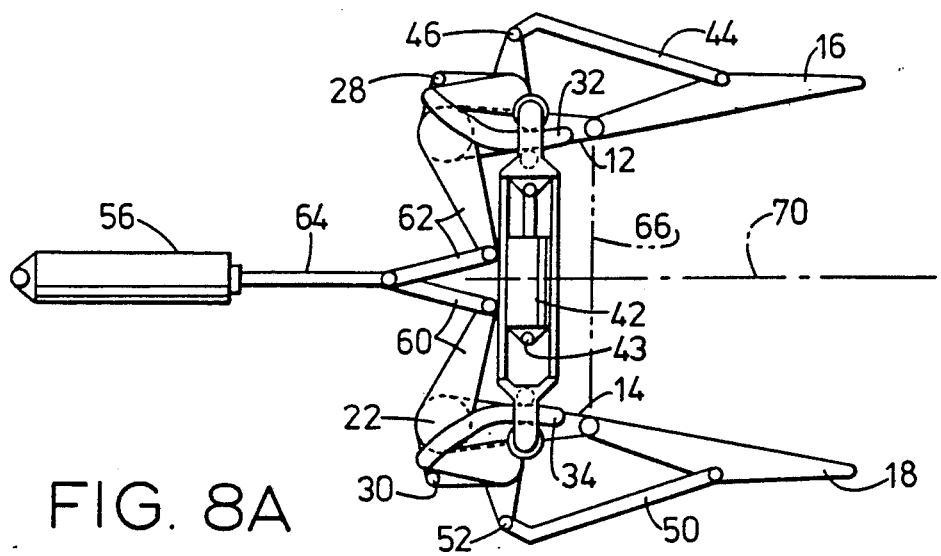
FIGS. 8A, 8B, and 8C schematically illustrate three positions of the cam crank means and convergent and divergent flaps of an exhaust nozzle incorporating the teachings of the present invention.
Figure 8B:
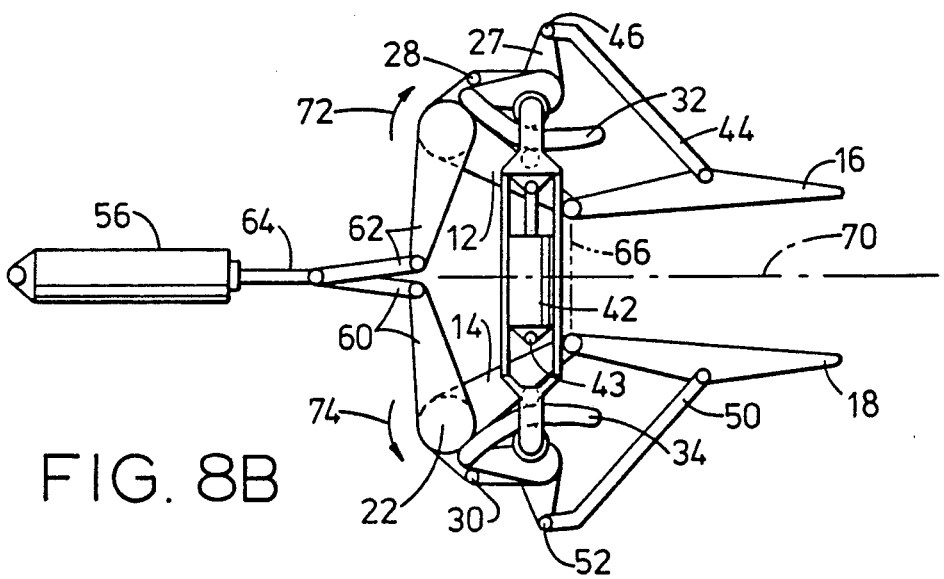
Figure 8C:
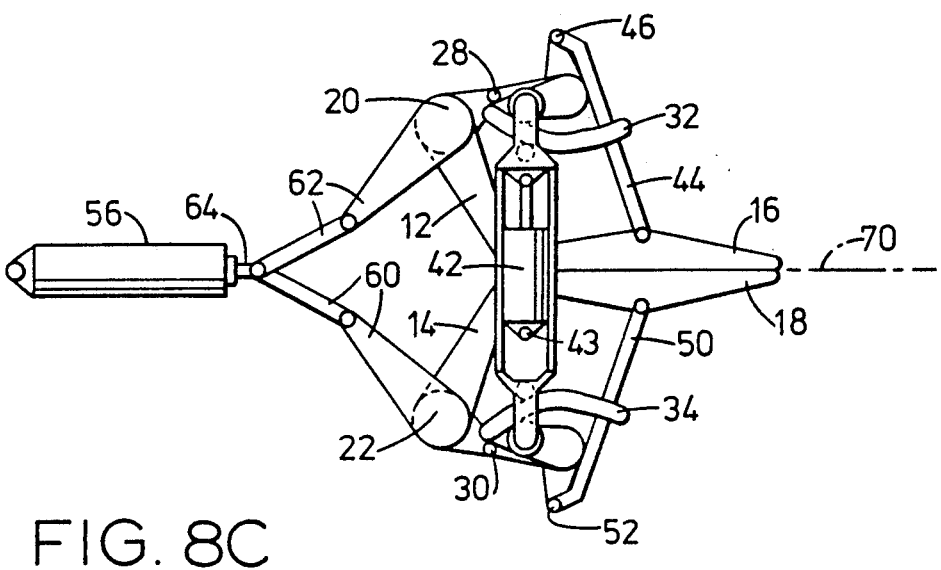

The travel of slider bars 36 and 38 and their associated followers 40 relative to cam tracks 32 and 34 as the flaps are moved to the various positions corresponding to the required conditions of the two-dimensional multipurpose exhaust nozzle 10 is best illustrated in FIGS. 8A, 8B, and 8C. In all three of these figures, convergent flap cranks 20 and 22 are illustrated above and below central axis 70 of the nozzle as two circles. In each case, one of the two circles corresponds to a cross section of the convergent flap crank at the outermost end of the crank, while the other circle corresponds to a cross section of the crank at the center thereof. Two circles are shown to represent the convergent flap crank since, as illustrated in FIG. 7, the convergent flap crank is configured with a slight contour or rise towards the center of the nozzle from each side of the crank. Furthermore, in each of FIGS. 8A, 8B, and 8C, first slider bar 36 is illustrated as a straight line extending between cam track 32 and cam track 34 on either side of central axis 70. In FIG. 8A, convergent flaps 12 and 14 are positioned for maximum augmentation, i.e., after burning, with throat area 66 being maximized. Divergent flaps 16 and 18 are shown in a vectored position upwardly relative to central axis 70 in this maximum augmentation position. Furthermore, link arms 62 are pushed to their forwardmost position by second hydraulic actuator 56 to position convergent flaps 12 and 14 to maximize the cross sectional area of throat 66.

With reference to FIG. 8B, piston 64 of second hydraulic actuator 56 has been withdrawn to pull lever arms 60 and 62 rearwardly along central axis 70 to rotate convergent flap crank 20 in a clockwise direction and to rotate convergent flap crank shaft 22 in a counterclockwise direction as shown by directional arrows 72 and 74, respectively. Such rotation of crank shafts 20 and 22 provides twofold motion of the convergent flaps and the divergent flaps. In the first instance, the convergent flaps 12 and 14 are drawn into the exhaust stream flow path to reduce the cross sectional area at throat 66. In this manner, the configuration of the present invention enables scheduling of the ratio of the cross sectional area of the throat to the cross sectional area at the exit from divergent flaps 16 and 18. Simultaneously, rotation of crank shafts 20 and 22 as shown in FIG. 8B moves pivot joints 28 and 30 in the same direction since those pivot joints are attached to the respective crank shafts 20 and 22. This motion in turn rotates cam cranks 24 and 26 and translates the rotation of cam cranks 24 and 26 into movement of divergent flaps 16 and 18 through link arms 44 and 50. However, this rotation of convergent flap cranks 20 and 22 does not change the vectoring or relative orientation of divergent flaps 16 and 18 relative to central axis 70 since such change of the orientation of the divergent flaps to affect vectoring is accomplished by movement of slider bars 36 and 38 upwardly or downwardly relative central axis 70 to move cam tracks 32 and 34 relative cam followers 40 at either end of the respective slider bars.

With reference to FIG. 8C, convergent flap crank shafts 20 and 22 are shown further rotated by additional rotation of link arms 60 and 62 backward along central axis 70. This further rotation of convergent flap crank shafts 20 and 22 in directions 72 and 74, respectively, acts to bring divergent flaps 16 and 18 together at central axis 70 thereby blocking the flow of the exhaust gas stream along the central axis of the nozzle. In the position shown in FIG. 8C, thrust reversing flaps configured in sidewalls of the nozzle are opened and the exhaust stream flow path is directed through the thrust reversing nozzles for STOL applications. It is pointed out that in each of the configurations illustrated in FIGS. 8A, 8B, and 8C the relative spacing of cam tracks 32 and 34 is maintained by the rigid slider bars 36 and 38. In either of the two configurations illustrated in FIGS. 8A and 8B, vectoring of divergent flaps 16 and 18 is accomplished by movement of the slider bars 36 and 38 upwardly and downwardly by first hydraulic actuator 42.

With the configuration of the cam actuator means of the present inventon the entire modulation of the convergent flaps including scheduling of the ratio of the cross sectional area of the throat to the exit area of the nozzle, and vectoring of the nozzle exhaust stream requires only two hydraulic actuation systems. In addition, each of the hydraulic actuators are fixed to the structure and do not rotate thereby precluding a necessity for flexible couplings which may lead to reliablity problems with leakage of the hydraulic fluid. This simplified flap modulation system of the present invention thus exhibits the advantages of high reliability, excellent fail-safe performance, reduced hydraulic actuator load requirements, and reduced cost and weight since the total number of hydraulic actuation systems for manipulation of the flaps is reduced. Also, since the divergent flaps are connected through the slider bars, pressure forces are balanced on each of the flaps in the vectored mode and are substantially balanced in the non-vectored mode thus requiring minimal hydraulic actuator force to maintain the flaps in the non-vectored position. This results in lower average actuator force and reduced hydraulic capacity. As noted above, such pressure balancing of the flaps during non-vectoring will also enhance the fail-safe performance of the system. For instance, if one of the hydraulic actuators is lost, the remaining actuator will be capable of providing partial vectoring by partial movement of one of the divergent flaps. Moreover, mechanical scheduling of the throat to exit area ratio as provided by the cam shaft arrangement of the present invention provides additional fail-safe capacities. Specifically, complete failure of the divergent flap actuators will result in the inability to vector the nozzle exhaust without affecting the ability to schedule the ratio of exit area to throat area in the non-vectored mode.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A two-dimensional gas turbine engine exhaust nozzle having opposed sidewalls, opposed convergent flaps, and variable position opposed divergent flaps defining a portion of an exhaust stream flow path, comprising:

convergent flap crank means positioned at other than a hinge point between said convergent and divergent flaps for supporting said convergent flaps;

cam crank means, pivotably attached to said convergent flap crank means, for positioning said divergent flaps;

means for rotating said cam crank means; and link arm means, extending from said cam crank means to said divergent flaps, for translating travel of said cam crank means into movement of said divergent flaps to vector an exhaust stream.

2. The two-dimensional exhaust nozzle of claim 1, wherein said convergent flap crank means includes first and second convergent flap cranks disposed at respective upstream ends of said opposed convergent flaps, and said cam crank means includes first and second cam cranks pivotably attached to respective ones of said first and second convergent flap cranks, each said cam crank having a cam surface at both ends.

3. The two-dimensional exhaust nozzle of claim 2, wherein said means for rotating said cam crank means includes first and second slider bars extending adjacent said sidewalls and connecting opposed respective ends of said first and second cam cranks to one another, said first and second slider bars each having a cam follower at both ends thereof for mating with respective cam surfaces of said first and second cam cranks.

4. The two-dimensional exhaust nozzle of claim 3, wherein said means for rotating said cam crank means further includes actuator means for moving said slider bars relative to said sidewalls to thereby move said cam followers along the respective cam surfaces of said cam cranks and to rotate said cam cranks to position said divergent flaps for vectored exhaust.

5. A two-dimensional gas turbine engine exhaust nozzle having opposed sidewalls, variable position opposed convergent flaps, and variable position opposed divergent flaps defining a portion of an exhaust stream flow path, comprising:

convergent flap crank means positioned at other than a hinge point between said convergent and divergent flaps for positioning and pivoting said convergent flaps;

means for rotating said convergent flap crank means;

cam crank means, pivotably attached to said convergent flap crank means, for positioning said divergent flaps;

means for rotating said cam crank means; and link arm means, extending from said cam crank means to said divergent flaps, for translating travel of said cam crank means into movement of said divergent flaps to vector an exhaust stream.

6. The two-dimensional exhaust nozzle of claim 5, wherein said convergent flap crank means includes first and second convergent flap cranks disposed at respective upstream ends of said opposed convergent flaps, and said cam crank means includes first and second cam cranks pivotably attached to respective ones of said first and second convergent flap cranks, each said cam crank having a cam surface at both ends.

7. The two-dimensional exhaust nozzle of claim 6, wherein said means for rotating said cam crank means includes first and second slider bars extending adjacent said sidewalls and connecting opposed respective ends of said first and second cam cranks to one another, said first and second slider bars each having a cam follower at both ends thereof for mating with the respective cam surfaces of said first and second cam cranks.

8. The two-dimensional exhaust nozzle of claim 7, wherein said means for rotating said cam crank means further includes actuator means for moving said slider bars relative to said sidewalls to thereby move said cam followers along the respective cam surfaces of said cam cranks and to rotate said cam cranks to position said divergent flaps for vectored exhaust.

9. The two-dimensional exhaust nozzle of claim 5, wherein said means for rotating said convergent crank means includes first and second crank shafts disposed at respective upstream ends of each said opposed convergent flap, lever arm means, extending from at least one end of each said crank shaft and substantially adjacent at least one of said sidewalls, for rotating said crank shafts, and actuator means for moving said lever arm means to selectively position said convergent flaps to thereby adjust the cross-sectional area of said exhaust stream flow path.

* * * * *